United States Patent
Xu et al.

(10) Patent No.: US 9,073,169 B2
(45) Date of Patent: Jul. 7, 2015

(54) FEEDBACK CONTROL OF POLISHING USING OPTICAL DETECTION OF CLEARANCE

(75) Inventors: Kun Xu, Sunol, CA (US); Ingemar Carlsson, Milpitas, CA (US); Feng Q. Liu, San Jose, CA (US); David Maxwell Gage, Sunnyvale, CA (US); You Wang, Cupertino, CA (US); Dominic J. Benvegnu, La Honda, CA (US); Boguslaw A. Swedek, Cupertino, CA (US); Yuchun Wang, Santa Clara, CA (US); Pierre Fontarensky, Sunnyvale, CA (US); Wen-Chiang Tu, Mountain View, CA (US); Lakshmanan Karuppiah, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 980 days.

(21) Appl. No.: 13/223,159
(22) Filed: Aug. 31, 2011

(65) Prior Publication Data
US 2012/0064801 A1    Mar. 15, 2012

Related U.S. Application Data

(63) Continuation-in-part of application No. 12/697,177, filed on Jan. 29, 2010, which is a continuation-in-part of application No. 12/267,526, filed on Nov. 7, 2008, now Pat. No. 8,639,377.

(60) Provisional application No. 61/379,273, filed on Sep. 1, 2010.

(51) Int. Cl.
*G06F 19/00* (2011.01)
*H01L 21/00* (2006.01)
(Continued)

(52) U.S. Cl.
CPC ............ *B24B 37/005* (2013.01); *B24B 37/042* (2013.01); *B24B 37/107* (2013.01); *B24B 37/30* (2013.01); *B24B 49/12* (2013.01); *G01B 11/0683* (2013.01)

(58) Field of Classification Search
CPC .... B24B 49/10; B24B 37/005; B24B 37/013; B24B 49/16; B24B 49/12; G01N 19/02; G05B 19/41875; G05B 2219/45031; H01L 22/20; H01L 21/67276
USPC .......................... 700/164, 121, 160, 174, 175
See application file for complete search history.

(56) References Cited

U.S. PATENT DOCUMENTS 4,953,982 A * 9/1990 Ebbing et al. ................. 356/504
5,270,222 A * 12/1993 Moslehi ............................ 438/7
(Continued)

FOREIGN PATENT DOCUMENTS

WO  WO2010/062910   6/2010

OTHER PUBLICATIONS

Lai et al., Stacked chalcogenide layers used as multi-state storage medium for phase change memory, 2006, Applied Physics, A 84, 21-25, 5 pages.*

(Continued)

*Primary Examiner* — Kenneth Lo
*Assistant Examiner* — Sunray R Chang
(74) *Attorney, Agent, or Firm* — Fish & Richardson P.C.

(57) ABSTRACT

A method of controlling polishing includes polishing a first substrate having an overlying layer on an underlying layer or layer structure. During polishing, the substrate is monitored with an in-situ monitoring system to generate a sequence of measurements. The measurements are sorted into groups, each group associated with a different zone of a plurality of zones on the substrate. For each zone, a time at which the overlying layer is cleared is determined based on the measurements from the associated group. At least one second adjusted polishing pressure for at least zone is calculated based on a pressure applied in the at least one zone during polishing the substrate, the time for the at least one zone, and the time for another zone. A second substrate is polished using the at least one adjusted polishing pressure.

26 Claims, 7 Drawing Sheets

(51) Int. Cl.
  *B24B 49/00* (2012.01)
  *B24B 37/005* (2012.01)
  *B24B 37/04* (2012.01)
  *B24B 37/10* (2012.01)
  *B24B 37/30* (2012.01)
  *B24B 49/12* (2006.01)
  *G01B 11/06* (2006.01)

(56) References Cited

U.S. PATENT DOCUMENTS

| | | | |
|---|---|---|---|
| 5,486,129 A | 1/1996 | Sandhu | |
| 5,921,855 A * | 7/1999 | Osterheld et al. | 451/527 |
| 6,406,924 B1 * | 6/2002 | Grimbergen et al. | 438/9 |
| 7,097,534 B1 | 8/2006 | Yampolskiy et al. | |
| 7,115,017 B1 | 10/2006 | Laursen et al. | |
| 7,409,260 B2 * | 8/2008 | David et al. | 700/160 |
| 7,513,818 B2 * | 4/2009 | Miller et al. | 451/5 |
| 7,822,500 B2 * | 10/2010 | Kobayashi et al. | 700/108 |
| 7,849,581 B2 * | 12/2010 | White et al. | 29/593 |
| 2002/0098777 A1 | 7/2002 | Laursen et al. | |
| 2002/0197871 A1 | 12/2002 | Hirose et al. | |
| 2005/0136800 A1 * | 6/2005 | Miller et al. | 451/5 |
| 2006/0009127 A1 | 1/2006 | Sakurai et al. | |
| 2006/0082785 A1 * | 4/2006 | Janos et al. | 356/503 |
| 2007/0243795 A1 * | 10/2007 | Kobayashi et al. | 451/5 |
| 2008/0138988 A1 | 6/2008 | David et al. | |
| 2008/0274670 A1 * | 11/2008 | Tada et al. | 451/6 |

OTHER PUBLICATIONS

International Search Report for PCT/US2011/023215 mailed Sep. 28, 2011.

* cited by examiner

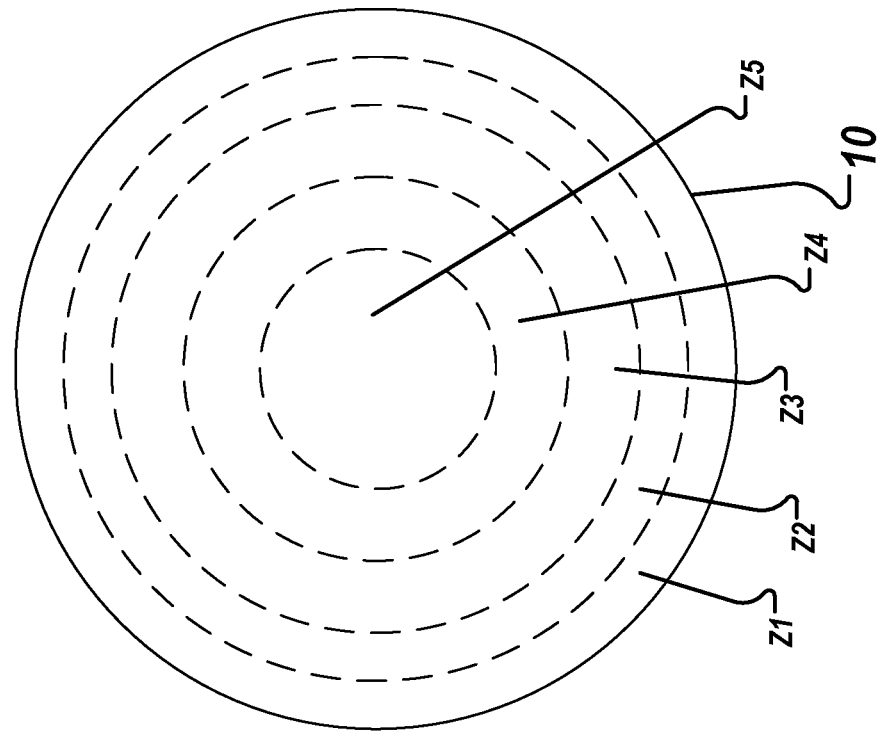
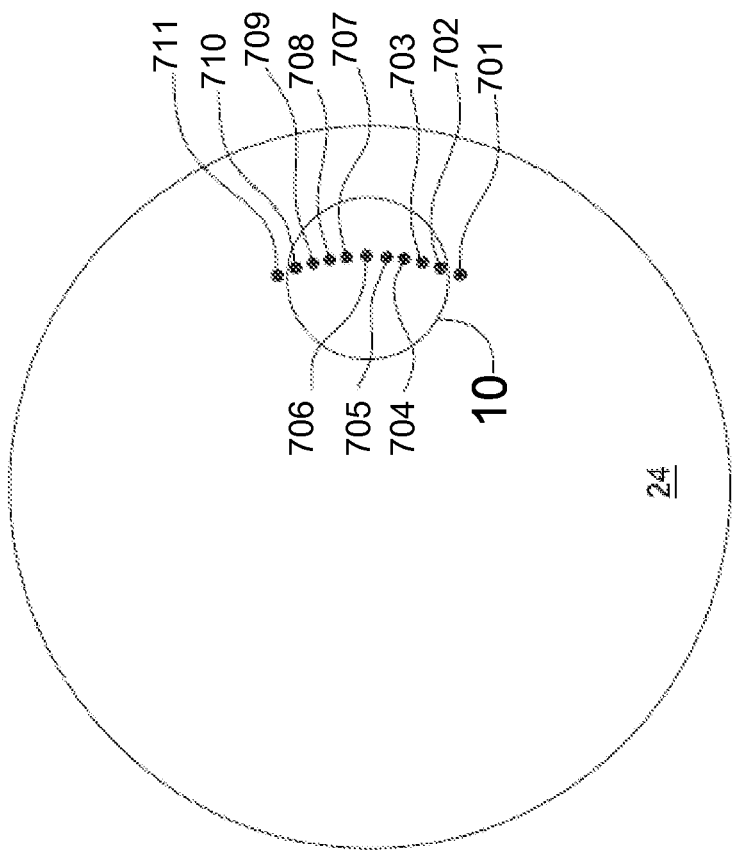
FIG. 3A
FIG. 3B

FEEDBACK CONTROL OF POLISHING USING OPTICAL DETECTION OF CLEARANCE

CROSS-REFERENCE TO RELATED APPLICATIONS

This application claims priority to U.S. Provisional Application Ser. No. 61/379,273, filed Sep. 1, 2010, which is incorporated by reference. This application is also a continuation-in-part of U.S. application Ser. No. 12/697,177, filed Jan. 29, 2010, which is a continuation-in-part of U.S. application Ser. No. 12/267,526, filed on Nov. 7, 2008, each of which is incorporated by reference.

TECHNICAL FIELD

This disclosure relates to using optical monitoring to control polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, such as oxide polishing, the filler layer is planarized until a predetermined thickness is left over the non planar surface. In addition, planarization of the substrate surface is usually required for photolithography.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. An abrasive polishing slurry is typically supplied to the surface of the polishing pad.

One problem in CMP is determining whether the polishing process is complete, i.e., whether a substrate layer has been planarized to a desired flatness or thickness, or when a desired amount of material has been removed. Variations in the slurry distribution, the polishing pad condition, the relative speed between the polishing pad and the substrate, and the load on the substrate can cause variations in the material removal rate. These variations, as well as variations in the initial thickness of the substrate layer, cause variations in the time needed to reach the polishing endpoint. Therefore, the polishing endpoint usually cannot be determined merely as a function of polishing time.

In some systems, a substrate is optically monitored in-situ during polishing, e.g., through a window in the polishing pad. However, existing optical monitoring techniques may not satisfy increasing demands of semiconductor device manufacturers.

SUMMARY

Due to the variations discussed above, an overlying layer can be cleared from different regions of a substrate at different times. For some materials, optical monitoring does not reliably detect the thickness of the layer being polished. However, optical monitoring can usually detect clearance of the overlying layer. A technique to improve uniformity in the time that at which an overlying layer is cleared (also termed the "clearing time") from different regions of the substrate is to detect clearance of the overlying layer for different regions of a first substrate, and adjust at least one polishing pressure on a subsequent second substrate based on the times that clearance was detected in the first substrate.

In one aspect, a method of controlling polishing includes polishing a first substrate having an overlying layer on an underlying layer or layer structure, during polishing, directing a light beam onto the first substrate, the light beam reflecting from the first substrate to generate a reflected light beam, during polishing, generating a sequence of measurements of intensity of the reflected light beam, sorting the measurements into groups, each group associated with a different zone of a plurality of zones on the substrate, for each zone, determining a time at which the overlying layer is cleared based on the measurements from the associated group, calculating at least one second adjusted polishing pressure for at least zone based on a pressure applied in the at least one zone during polishing the substrate, the time for the at least one zone, and the time for another zone, and polishing a second substrate using the at least one adjusted polishing pressure.

Implementations can include one or more of the following features. The light beam may be a non-polarized light beam. The non-polarized light beam may be a laser beam. The non-polarized light beam may be a broadband visible light beam. The overlying layer may be GST, the light beam may include an infra-red component, and the measurements of intensity of the reflected light beam may be measurements of intensity of an infra-red component of the reflected light beam. The overlying layer may be a metal, e.g., copper, aluminum, tungsten, tantalum, titanium or cobalt, the light beam may include a red component, and the measurements of intensity of the reflected light beam may be measurements of intensity of the red component of the reflected light beam. The zones may be concentric radial zones. Polishing may include polishing with a carrier head having a plurality of chambers to apply independently adjustable pressures to the plurality of zones on the substrate. During polishing of the first substrate a first chamber of the plurality of chambers may apply a first pressure to a first zone of the plurality of zones and a second chamber of the plurality of chambers may apply a second pressure to a second zone of the plurality of zones. Determining a time at which the underlying layer is exposed for each zone may include determining a first time for a first zone from the plurality of zones and determining a second time for a second zone from the plurality of zones. At least one adjusted polishing pressure for the first chamber may be calculated based on the first pressure, the first time and the second time. The second zone may be an innermost zone or an outermost zone. Calculating the adjusted pressure P1' may include calculating P1'=P1*(T1/T2) wherein P1 is the first pressure, T1 is the first time and T2 is the second time. Determining a time at which the underlying layer is exposed may include determining a time at which the sequence of measurements stabilizes. Determining a time at which the sequence of measurements stabilizes may include determining that a slope of a trace generated by the sequence of measurements remains within a predetermined range for a predetermined time period.

In another aspect, a method of controlling polishing includes polishing a first substrate having an overlying layer on an underlying layer or layer structure, during polishing, monitoring the substrate with an in-situ monitoring system to generate a sequence of measurements, sorting the measurements into groups, each group associated with a different zone of a plurality of zones on the substrate, for each zone, determining a time at which the overlying layer is cleared based on the measurements from the associated group, calculating at least one second adjusted polishing pressure for at least zone based on a pressure applied in the at least one zone during polishing the substrate, the time for the at least one zone, and the time for another zone, and polishing a second substrate using the at least one adjusted polishing pressure.

Implementations can include one or more of the following features. The in-situ monitoring system may include an optical monitoring system that directs a light beam onto the substrate. The in-situ monitoring system may include a friction sensor. Determining a time at which the underlying layer is exposed for each zone may include determining a first time for a first zone from the plurality of zones and determining a second time for a second zone from the plurality of zones. At least one adjusted polishing pressure for the first chamber may be calculated based on the first pressure, the first time and the second time. Calculating the adjusted pressure P1' comprises calculating P1'=P1*(T1/T2) wherein P1 is the first pressure, T1 is the first time and T2 is the second time.

In another aspect, a computer-readable medium has stored thereon instructions, which, when executed by a processor, causes the processor to perform operations Implementations can include one or more of the following potential advantages. Within-wafer non-uniformity (WIWNU) can be reduced. Clearance of an overlying layer, e.g., a GST layer or a metal layer, can occur substantially simultaneously over the surface of the substrate, which can improve polishing throughput. A polishing process can be adjusted to compensate for process drift over consumable life (e.g. polish head, pad, or slurry). Head to head variation in removal profile can also be improved.

The details of one or more embodiments are set forth in the accompanying drawings and the description below. Other aspects, features and advantages will be apparent from the description and drawings, and from the claims.

DESCRIPTION OF DRAWINGS

FIG. 3A shows an overhead view of a substrate on a platen and shows locations where measurements are taken.
FIG. 3B shows concentric zones on a substrate.

DETAILED DESCRIPTION

Figure 1:
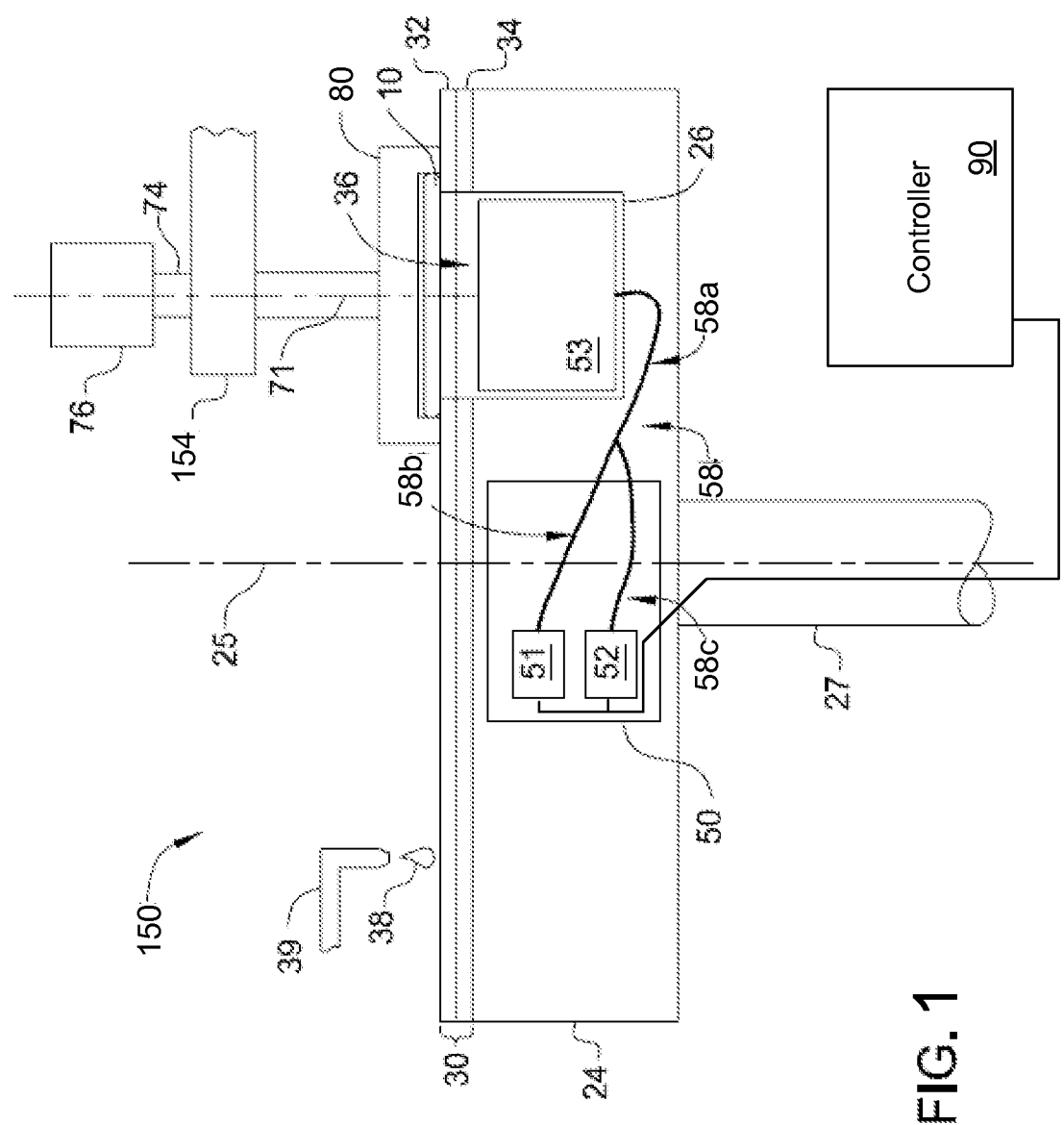
FIG. 1 shows a schematic cross-sectional view of a polishing station.

In some semiconductor chip fabrication processes an overlying layer, e.g., a metal such as copper, tungsten, aluminum, titanium, tantalum or cobalt, a semimetal, or an alloy of metal(s) and/or semimetal(s), e.g., GeSbTe (a ternary compound of germanium, antimony and tellurium, also known as GST), is deposited over a patterned underlying layer or layer structure, e.g., a stack of one or more other layers. The one or more other layers can include layers of dielectric material, e.g., a low-k material and/or a low-k cap material, or of barrier metal, e.g., tantalum nitride or titanium nitride. Often the overlying layer is polished until it is "cleared", i.e., until the top surface of the underlying layer or layer structure is exposed. Portions of the overlying layer may be left in trenches, holes, etc., provided by the pattern of the underlying layer or layer structure.

In general, it would be desirable to have the overlying layer clear completely (e.g., no discontinuous regions of the overlying layer coating the top surface of the underlying layer or layer structure) and at substantially the same time across the surface of the substrate. This can avoid overpolishing, improve throughput and reduce within-wafer non-uniformity (WIWNU).

A problem with monitoring of polishing of the overlying layer is that for some materials, e.g., metals with high reflectivity, optical (e.g., spectrographic) monitoring of the substrate may not provide useful information regarding the thickness of the overlying layer during bulk polishing. Without being limited to any particular theory, at wavelengths typically used for optical monitoring the extinction coefficient of the material of the overlying layer may be sufficiently high that the reflectivity may not appreciably change as the thickness is reduced during bulk polishing. As such, optical monitoring may not be suitable for in-situ feedback control of polishing parameters during bulk polishing of some materials. Although the reflectivity of the overlying layer can change as it is cleared and the underlying layer is exposed, by the time such a change in optical behavior is detected, it can be too late for an in-situ adjustment of the polishing rate of the substrate being polished to improve the uniformity of clearing time across the substrate.

In addition, for some of these same materials, eddy current monitoring is not effective in detecting clearance of the overlying layer. For example, barrier metals, such as titanium nitride and tantalum nitride, cannot provide a eddy current good signal due to their intrinsic high resistivity. For other metals, e.g., copper, aluminum and tungsten, the eddy current sensor may not pick up a signal from the discontinuous metal films remaining on the substrate, and thus detection of clearance of the overlying layer may be unreliable.

However, for many processes the overlying layer has a different reflectivity than the underlying layer or layer structure. Without being limited to any particular theory, this may be because the overlying layer has a different, e.g., higher, extinction coefficient than the underlying layer. In such cases, the reflectivity or reflected spectrum from the substrate should change when the overlying layer clears and the underlying layer is exposed.

A technique discussed below to improve uniformity in the time that the overlying layer is cleared is to optically detect clearance of the overlying layer in multiple different regions of a first substrate, and adjust a pressure on at least one region of a subsequent second substrate based on the times that clearance was detected in the first substrate such that clearance will occur closer to the same time, e.g., at substantially the same time, than without such an adjustment.

While this technique can particularly address the problem described above, it is also generally applicable even if optical monitoring can provide useful information regarding the thickness of the overlying layer during bulk polishing. In this case, the technique can have other advantages, such as consistency of process control between different materials, or reduction of computational load (because detection of clearing may be less computationally intense than determination of thickness). Thus, the technique can be applicable to other semitransparent materials, e.g. semitransparent metals, e.g., GST. In particular, the technique is if there is a clear change in behavior of the reflectance trace as the layer is cleared.

FIG. 1 is a schematic cross-sectional view of a chemical mechanical polishing station 150 operable to polish the substrate 10. The polishing station 150 includes a rotatable disk-shaped platen 24, on which a polishing pad 30 is situated. The platen 24 is operable to rotate about an axis 25. For example, a motor (not shown) can turn a drive shaft 27 to rotate the platen 24. The polishing pad 30 can be detachably secured to the platen 24, for example, by a layer of adhesive. When worn, the polishing pad 30 can be detached and replaced. The polishing pad 30 can be a two-layer polishing pad with an outer polishing layer 32 and a softer backing layer 34.

The polishing station 150 can include a combined slurry/rinse arm 39. During polishing, the arm 39 is operable to dispense slurry 38, e.g., a liquid with abrasive particles. Alternatively, the polishing station 150 includes a slurry port operable to dispense slurry onto polishing pad 30.

The polishing station 150 also includes the carrier head 80 that is operable to hold the substrate 10 against the polishing pad 30. The carrier head 80 is suspended from a support structure, for example, the carousel 154, and is connected by a carrier drive shaft 74 to a carrier head rotation motor 76 so that the carrier head can rotate about an axis 71. In addition, the carrier head 80 can oscillate laterally in a radial slot formed in the support structure. In operation, the platen 24 is rotated about its central axis 25, and the carrier head 80 is rotated about its central axis 71 and translated laterally across the top surface of the polishing pad 30.

Figure 2:
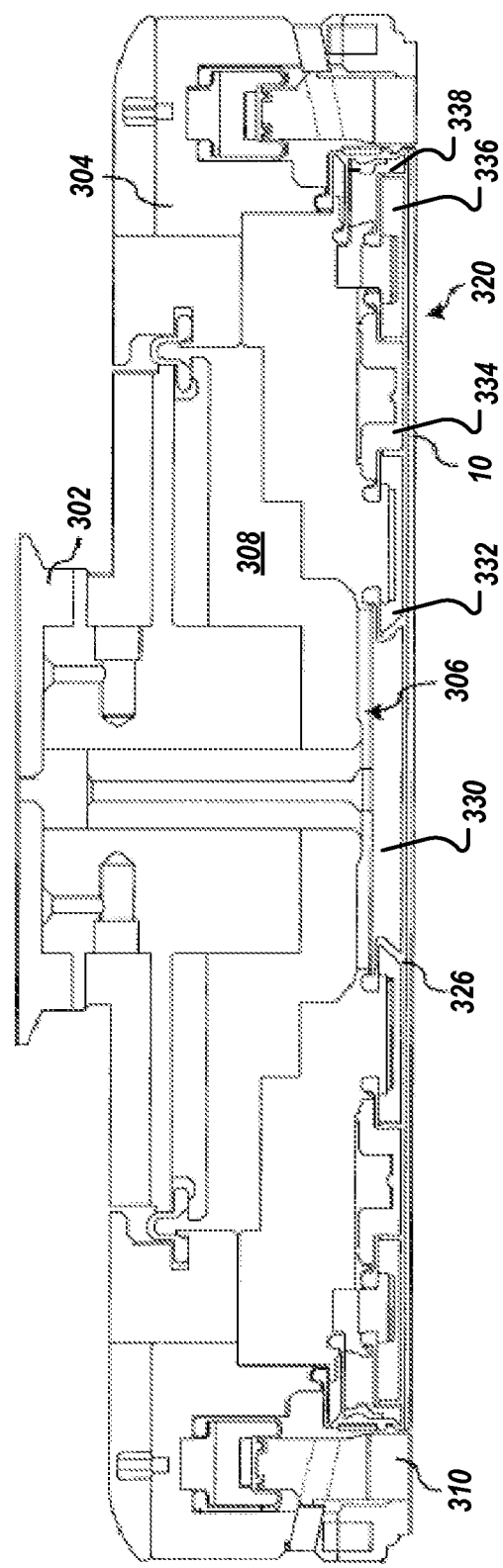
FIG. 2 shows a schematic cross-sectional view of a carrier head.

Referring to FIG. 2, the carrier head 80 can include multiple chambers in order to apply independently controllable pressures to multiple regions, e.g., concentric regions, on the substrate. In one implementation, the carrier head 80 includes a housing 302, a base assembly 304, a gimbal mechanism 306 (which can be considered part of the base assembly 304), a loading chamber 308, a retaining ring 310, and a substrate backing assembly 320 which includes a flexible membrane 326 that defines multiple independently pressurizable chambers, such as an inner chamber 330, a middle chambers 332, 334, 336, and an outer chamber 338. These chambers control the pressure on concentric regions of the flexible membrane, thus providing independent pressure control on concentric portions of the substrate 10. In some implementations, the carrier head 80 includes five chambers and a pressure regulator for each of the chambers. For example, referring to FIG. 3B, the five chambers 330, 332, 334, 336, and 338 can control the pressure applied to five concentric zones Z1, Z2, Z3, Z4 and Z5 on the substrate 10.

Returning to FIG. 1, the polishing station 150 also includes an optical monitoring system, which can be used to determine a polishing endpoint as discussed below. The optical monitoring system includes a light source 51 and a light detector 52. Light passes from the light source 51, through the polishing pad 30, impinges and is reflected from the substrate 10 back through the polishing pad, and travels to the light detector 52.

Optical access through the polishing pad 30 is provided by including an aperture (i.e., a hole that runs through the pad) or a solid window 36. The solid window can be secured to the polishing pad 30, although in some implementations the solid window 36 can be supported on the platen 24 and project into an aperture in the polishing pad 30. In some implementations the solid window 36 is secured in the polishing pad 30 and is a polyurethane window. The polishing pad 30 is usually placed on the platen 24 so that the aperture or window overlies an optical head 53 situated in a recess 26 in the top surface of the platen 24. The optical head 53 consequently has optical access through the aperture or window to a substrate being polished.

A bifurcated optical cable 58 can be used to transmit the light from the light source 51 to the window 36 and back from the window 36 to the light detector 52. The bifurcated optical cable 58 can include a "trunk" 58a and two "branches" 58b and 58c.

As mentioned above, the platen 24 includes the recess 26, in which the optical head 53 is situated. The optical head 53 holds one end of the trunk 58a of the bifurcated fiber cable 58, which is configured to convey light to and from a substrate surface being polished. The optical head 53 can include one or more lenses or a window overlying the end of the bifurcated fiber cable 58. Alternatively, the optical head 53 can merely hold the end of the trunk 58a adjacent the window in the polishing pad. The optical head 53 can be removed from the recess 26 as required, for example, to effect preventive or corrective maintenance.

The platen 24 includes a removable in-situ monitoring module 50. The in-situ monitoring module 50 can include one or more of the following: the light source 51, the light detector 52, and circuitry for sending and receiving signals to and from the light source 51 and light detector 52. For example, the output of the detector 52 can be a digital electronic signal that passes through a rotary coupler, e.g., a slip ring, in the drive shaft 27 to a controller 90 for the optical monitoring system. Similarly, the light source can be turned on or off in response to control commands in digital electronic signals that pass from the controller 90 through the rotary coupler to the module 50.

The in-situ monitoring module can also hold the respective ends of the branch portions 58b and 58c of the bifurcated optical fiber cable 58. The light source is operable to transmit light, which is conveyed through the branch 58b and out the end of the trunk 58a located in the optical head 53, and which impinges on a substrate being polished. Light reflected from the substrate is received at the end of the trunk 58a located in the optical head 53 and conveyed through the branch 58c to the light detector 52.

In some implementations, the bifurcated fiber cable 58 is a bundle of optical fibers. The bundle includes a first group of optical fibers and a second group of optical fibers. An optical fiber in the first group is connected to convey light from the light source 51 to a substrate surface being polished. An optical fiber in the second group is connected to receive light reflecting from the substrate surface being polished and convey the received light to a light detector. The optical fibers can be arranged so that the optical fibers in the second group form an X-like shape that is centered on the longitudinal axis of the bifurcated optical fiber (as viewed in a cross section of the bifurcated fiber cable 58). Alternatively, other arrangements can be implemented. For example, the optical fibers in the second group can form V-like shapes that are mirror images of each other. A suitable bifurcated optical fiber is available from Verity Instruments, Inc. of Carrollton, Tex.

There is usually an optimal distance between the window 36 of the polishing pad 30 and the end of the trunk 58a of bifurcated fiber cable 58 proximate to the window 36 of the polishing pad 30. The distance can be empirically determined and is affected by, for example, the reflectivity of the window 36, the shape of the light beam emitted from the bifurcated fiber cable, and the distance to the substrate being monitored. In some implementations, the bifurcated fiber cable is situated so that the end proximate to the window 36 is as close as possible to the bottom of the window 36 without actually touching the window 36. With this implementation, the polishing station 150 can include a mechanism, e.g., as part of the optical head 53, that is operable to adjust the distance between the end of the bifurcated fiber cable 58 and the bottom surface of the polishing pad window 36. Alternatively, the proximate end of the bifurcated fiber cable is embedded in the window 36.

If the overlying layer is GST, then the light source 51 can be selected to emit light in the near infrared range, e.g., monochromatic light, e.g., light with a wavelength of about 1.3 microns. Alternatively, the light source 51 can be configured to emit light with a narrow bandwidth, e.g. around 1.3 microns. Alternatively, the light source 51 can be configured to emit light with a wide bandwidth in the near infrared range, e.g., including light around 1.3 microns, and the detector 52 can be configured to detect light with a narrower bandwidth, e.g. around 1.3 microns, or the detector can be a spectrometer configured to use intensity measurements from the near infrared range, e.g. around 1.3 microns. In some implementations, the light source 51 emits light having wavelengths in the 2-5 microns range, suitable for GST thickness measurements. In some implementations, the light source 41 emits light having wavelengths in the 10 micron range, suitable for GST structural phase measurements.

If the overlying layer is another metal, e.g., copper, tungsten, aluminum, titanium or tantalum, or a barrier metal, e.g., titanium nitride or tantalum nitride, then the light source 51 can be selected to emit light in the visible range, e.g., red light. The light source can emit monochromatic light, e.g., light with a wavelength between about 650-670 nm. Alternatively, the light source 51 can be configured to emit light with a narrow bandwidth, e.g. around 650-670 nm, or with a wide bandwidth in the visible light range. The detector 52 can be configured to detect a total intensity of the reflected light beam across some or all of the visible light range, e.g., the detector can be a simple photodiode that operates in the visible light range or be a spectrometer configured to sum intensities across a wavelength band, or the detector can be configured to detect an intensity of the reflected light beam at substantially a single wavelength, e.g., the detector can be a photodiode that operates at a substantially a single wavelength, or a spectrometer configured to use the intensity measurement of a single wavelength from the detected spectrum. The detector 52 can be sensitive to red light, e.g., a wavelength between about 650-670 nm.

The light source 51 and light detector 52 are connected to the controller 90 to control their operation and to receive their signals. With respect to control, the controller 90 can, for example, synchronize activation of the light source 51 with the rotation of the platen 24. As shown in FIG. 3A, the controller 90 can cause the light source 51 to emit a series of flashes starting just before and ending just after the substrate 10 passes over the in-situ monitoring module. (Each of points 701-711 depicted represents a location where light from the in-situ monitoring module impinged and reflected off) Alternatively, the controller 90 can cause the light source 51 to emit light continuously starting just before and ending just after the substrate 10 passes over the in-situ monitoring module. Although not shown, each time the substrate 10 passes over the monitoring module, the alignment of the substrate 10 with the monitoring module can be different than in the previous pass. Over one rotation of the substrate 10, intensity measurements are obtained from different angular locations on the substrate 10, as well as different radial locations. That is, some intensity measurements are obtained from locations closer to the center of the substrate 10 and some are closer to the edge. The controller can sort the intensity measurements from the substrate 10 into groups corresponding to the concentric radial zones, e.g., by calculating the distance between the location of the intensity measurement and the center of the substrate. The radial zones can corresponding to the different controllable zones on the carrier head 80. For example, referring to FIG. 3B, the intensity measurements can be sorted into groups corresponding to concentric radial zones Z1, Z2, Z3, Z4 and Z5 on the substrate 10. Three, four, five, six, seven or more zones can be defined on the surface of the substrate 10.

With respect to receiving signals, the controller 90 can receive, for example, a signal with the intensity of light received by the light detector 52. The controller 90 can process the signal to when the underlying layer was exposed, and use this information to adjust the polishing parameters, e.g., pressure in one of the carrier head chambers, in order to improve polishing uniformity.

Figure 4:
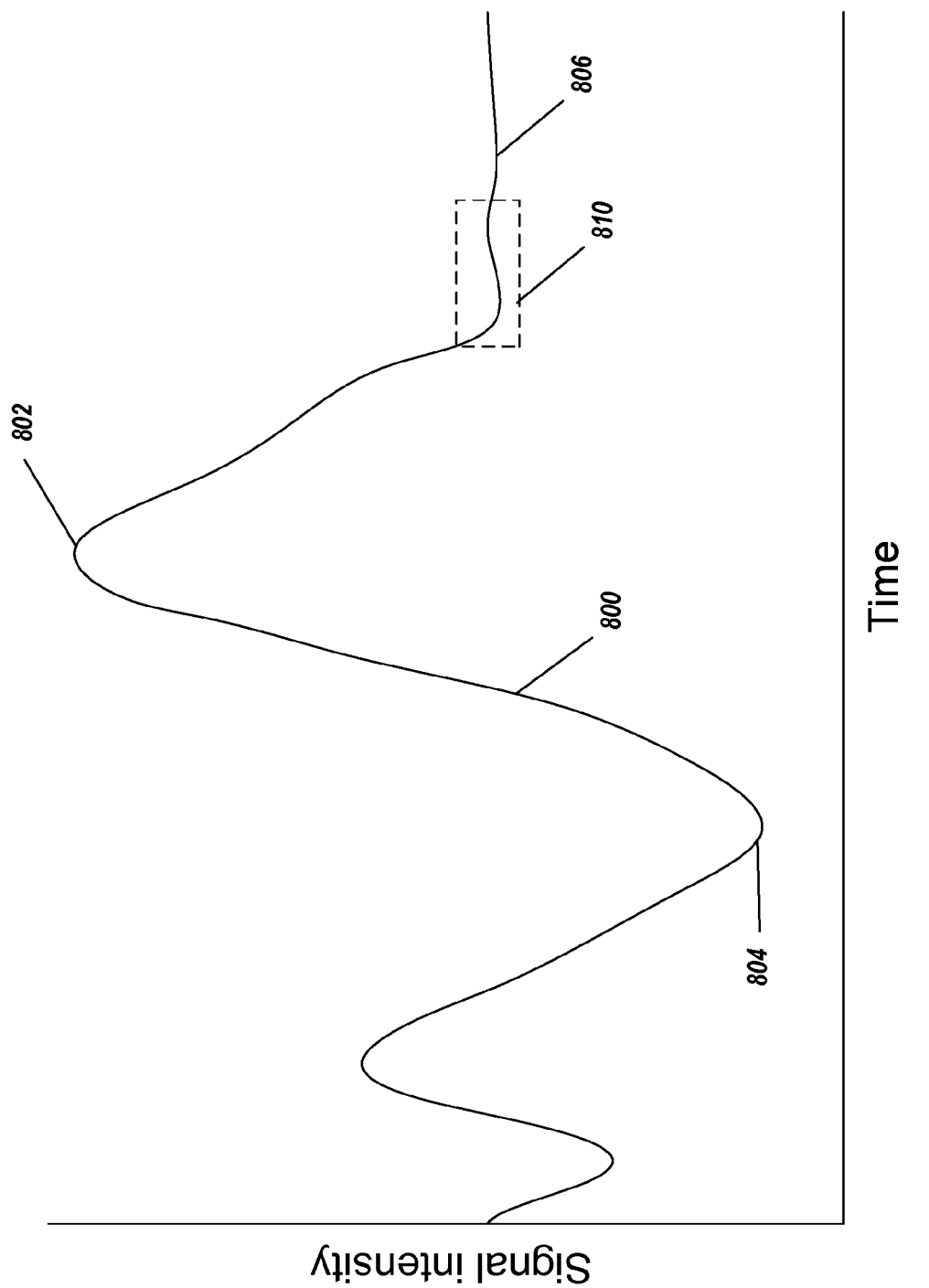
FIG. 4 shows a schematic exemplary graph of signal intensity as a function of time for a substrate being polished that includes a layer of GST.

Referring to FIG. 4, for a given radial zone, the sequence of measurements from a series of sweeps of the sensor generates an intensity trace 800 which is a function of time or number of platen rotations. As illustrated, for polishing of a GST layer, the intensity of light reflected from the substrate 10 evolves as polishing progresses, passing through one or more peaks 802 and/or valleys 804, and then stabilizing at a plateau 806. While the intensity trace 800 shown in FIG. 4 is merely illustrative, and have many other shapes, intensity traces generated during polishing of GST will have a common feature in that after an initial period of variation, the intensity trace stabilizes at a plateau 806.

Without being limited to any particular theory, as the GST layer is being polished, its thickness changes. The change in thickness causes a variation in the interference between the light reflected from the surface of the GST layer and any underlying layer, resulting in variations in the intensity of the reflected light. However, once the layer underlying the GST layer is exposed, the signal is primarily due to reflection from the underlying layer, and the reflected signal intensity stabilizes. By detecting when the intensity trace stabilizes, the controller can determine the time at which the GST layer was cleared and the underlying layer was exposed. Detection of stabilization of the intensity trace can include detecting whether the slope of the trace remains within a predetermined range (near zero slope) for some threshold time period 810. Detection of stabilization of the intensity trace can also include detecting whether the magnitude of the trace remains within a range (set relative to the magnitude at the beginning of the time period) for the threshold time period.

Figure 5:
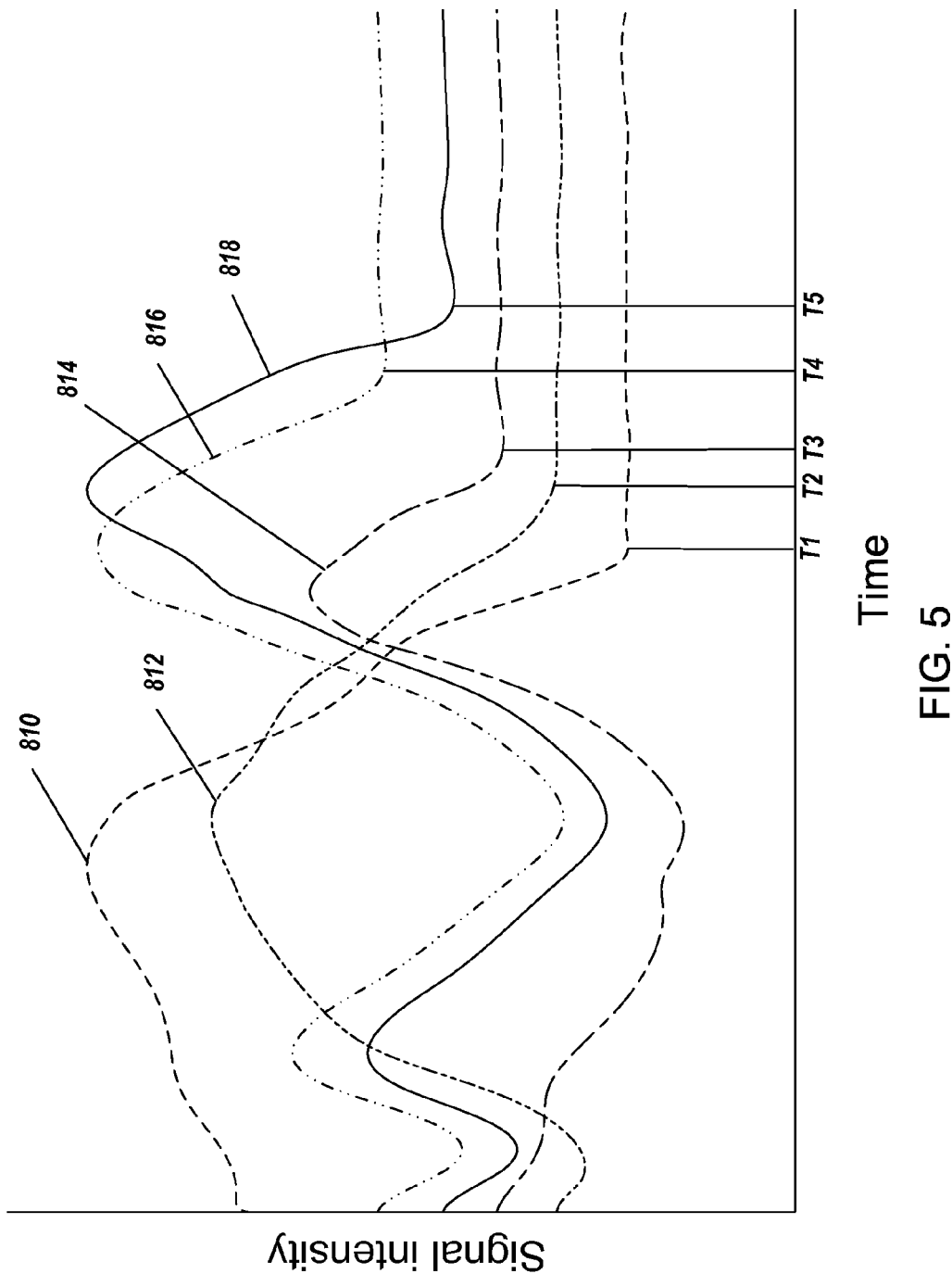
FIG. 5 shows a schematic exemplary graph of signal intensities from multiple regions of a substrate being polished that includes a layer of GST.

As noted above, the intensity measurements from the optical sensor can be sorted into different radial zones. This permits creation of a separate intensity trace for each radial zone. For example, as shown in FIG. 5, if the intensity traces are divided into five radial zones, then five corresponding traces, e.g., traces 810, 812, 814, 816 and 818, can be generated.

Figure 6:
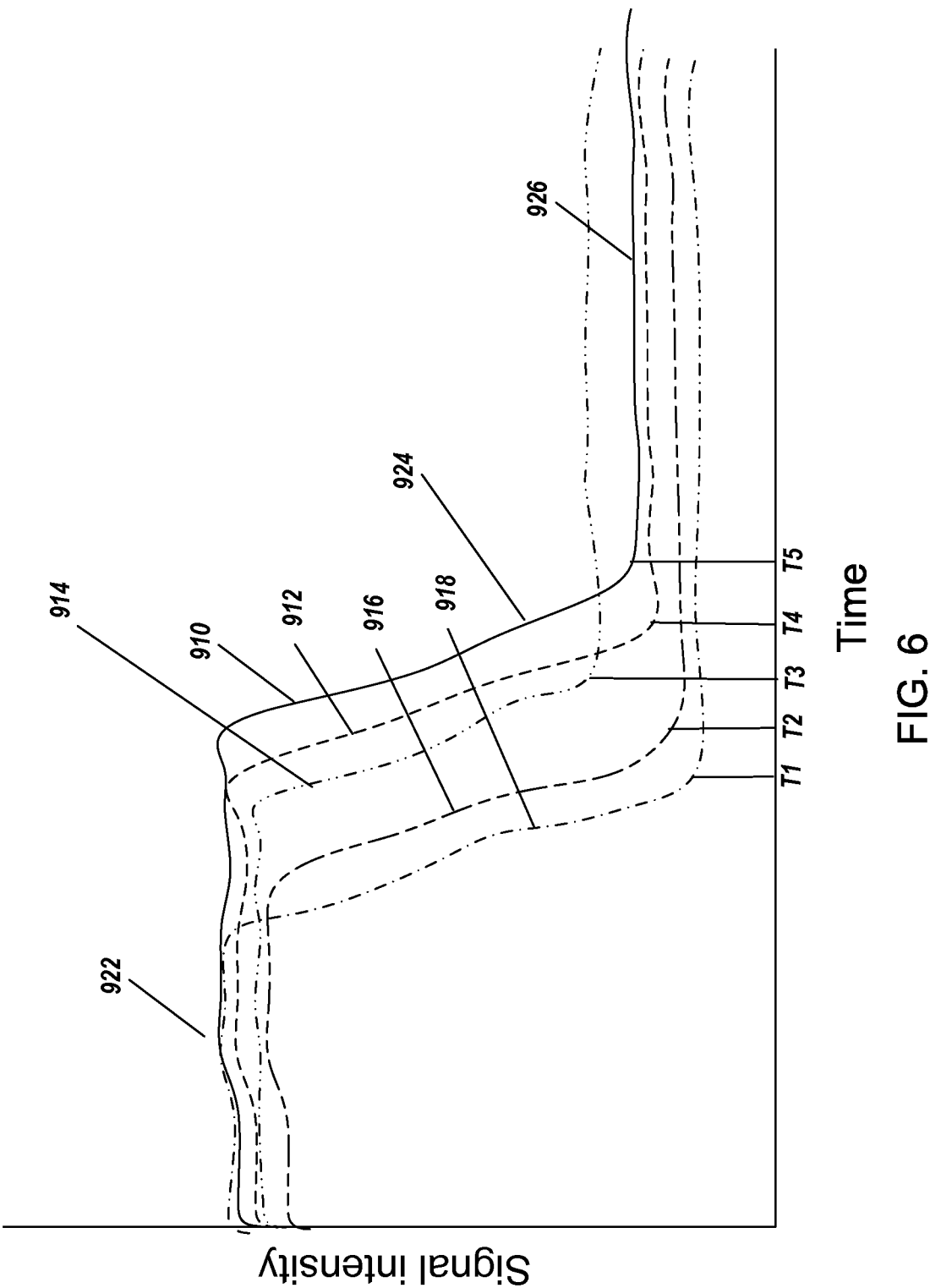
FIG. 6 shows a schematic exemplary graph of signal intensities from multiple regions of a substrate being polished that includes a layer of metal.

Referring to FIG. 6, for polishing of an overlying layer that is a reflective material, e.g., a metal, such as copper, tungsten, aluminum, titanium or tantalum, the sequence of measurements from a series of sweeps of the sensor generates multiple intensity traces which ares a function of time or number of platen rotations. For example, if the intensity traces are divided into five radial zones, then five corresponding traces, e.g., traces 910, 912, 914, 916 and 918, can be generated. In general, for each trace, the intensity remains relatively stable in an initial plateau 922. However, as the overlying layer clears and the underlying layer is exposed, the intensity trace has a sharp drop 924. Once the top surface of the underlying layer is completely exposed, the intensity trace stabilizes in a second plateau 926. By detecting when the intensity trace drops and then stabilizes, the controller can determine the time at which the reflective overlying layer was cleared and the underlying layer was exposed in each region of the substrate.

A method of polishing will be explained with reference to FIG. 7. A first substrate with an overlying layer is polished using a carrier head with multiple controllable zones and using a default pressure for each zone (step 910). For example, if there are five zones, then pressures P1, P2, P3, P4 and P5 can be applied by the five chambers of the carrier head to the respective zones Z1, Z2, Z3, Z4 and Z5 (see FIG. 3B) on the substrate. During polishing, the overlying layer is monitored in-situ using the optical monitoring system. Intensity measurements from the monitoring system are sorted into groups corresponding to radial zones, and for each zone, the time that the overlying layer is cleared to expose the underlying layer is calculated based on the measurements from the corresponding group (step 920). For example, referring to FIG. 5, five intensity traces 810, 812, 814, 816 and 818, can be generated, with resulting clearance times T1, T2, T3, T4 and T5, for the respective zones Z1, Z2, Z3, Z4 and Z5 (see FIG. 3B). For example, referring to FIG. 6, five intensity traces 910, 912, 914, 916 and 918, can be generated, with resulting clearance times T1, T2, T3, T4 and T5, for the respective zones Z1, Z2, Z3, Z4 and Z5 (see FIG. 3B).

Returning to FIG. 7, next, adjusted polishing pressures are calculated for at least one of the controllable zones of the carrier head (step 930). Pressures can be calculated under a simple Prestonian model to adjust the polishing rates to cause each zone to clear at approximately the same time. One zone, e.g., the innermost zone Z5, can be selected as the reference zone. For each other zone, an adjusted pressure is calculated by multiplying the default pressure by the ratio of the polishing time of the zone being adjusted to the polishing time of the reference zone. For example, adjusted pressures P1', P2', P3' and P4' for zones Z1, Z2, Z3, Z4 can be calculated as P1'=P1*(T1/T5), P2'=P2*(T2/T5), P3'=P3*(T3/T5) and P4'=P4*(T4/T5). Alternatively, the outermost zone, or one of the middles zones, could be selected as the reference zone. A subsequent substrate is then polished with the adjusted polishing pressures (step 940).

Polishing of the subsequent substrate can monitored with the optical monitoring system), a new set of clearance times T1, T2, T3, T4 and T5, for the respective zones Z1, Z2, Z3, Z4 and Z5 can be determined (step 910), and a new set of adjusted pressures calculated with the previously calculated adjusted pressures being used as the new default pressures (step 920), and another substrate polished with the new set of adjusted pressures. More generally, the system can perform an iterative feedback method, in which, for each next substrate to be polished, the clearance times and pressures for the prior substrate are used to calculate adjusted pressures for the next substrate. In addition, it is possible that adjusted pressures could be calculated based on a weighted running average of clearance times and/or pressures for multiple prior substrate, rather than only the immediately prior substrate.

Figure 7:
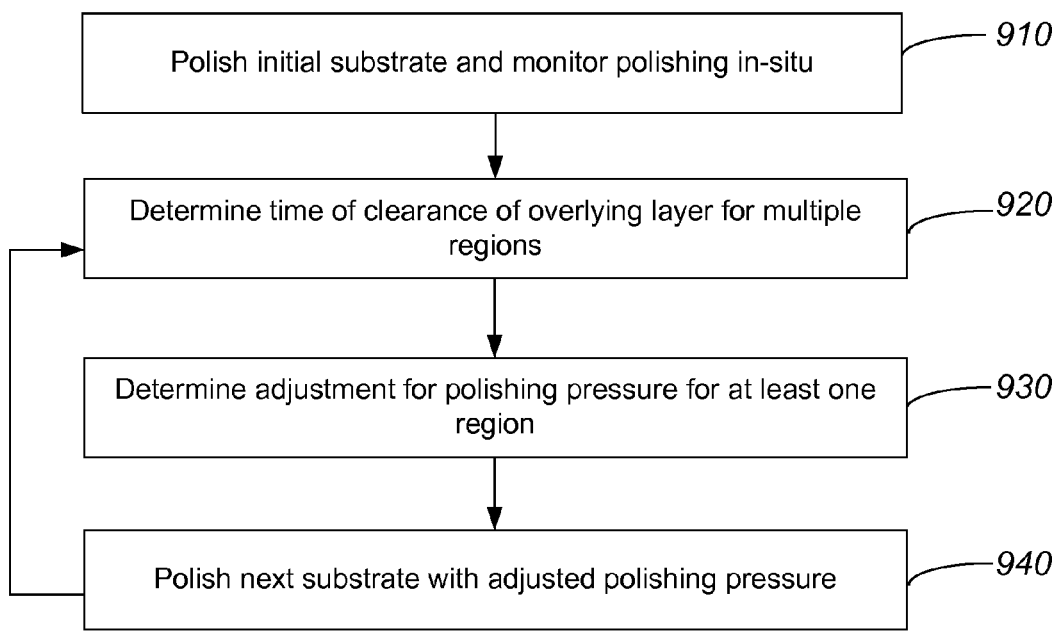
FIG. 7 shows a flow chart for a polishing process.
Like reference symbols in the various drawings indicate like elements.

In some implementations, a substrate with an overlying layer is polished at a first platen for a predetermined amount of time to perform bulk clearing, and then polished at a second platen using the technique described for FIG. 7. If the overlying layer is a conductive material, then at the first platen, thickness of the layer can be monitored with an eddy current monitoring system. That is, the substrate is polished at the first platen, the thickness of the conductive layer is monitored in-situ using the eddy current monitoring system, thickness measurements from the first monitoring system are sorted into groups corresponding to radial zones, and the controller calculates a projected times for each radial zone for the overlying layer to reach a target thickness. One or more adjusted pressures are calculated so that the radial zones of the substrate will reach the target thickness closer to the same time than without such adjustment, and the adjusted pressures are applied to complete polishing of the substrate at the first platen. Then the substrate is polished at a second platen, the thickness of the overlying layer is monitored in-situ using an optical monitoring system, intensity measurements from the second monitoring system are sorted into groups corresponding to radial zones, the controller detects the times at which the intensity traces reach the plateau indicating that overlying layer has cleared, and one or more adjusted pressures for polishing a subsequent substrate at the second platen are calculated.

Although the discussion above focuses on detection of clearing using optical techniques, the process may be applicable to other in-situ monitoring techniques that can detect clearance of the overlying layer, such as local surface friction sensing (e.g., as described in U.S. Pat. No. 7,513,818, incorporated by reference), or eddy current monitoring (assuming that accuracy of the eddy current monitoring technique to detect clearance is eventually improved).

Implementations and all of the functional operations described in this specification can be implemented in digital electronic circuitry, or in computer software, firmware, or hardware, including the structural means disclosed in this specification and structural equivalents thereof, or in combinations of them. Implementations described herein can be implemented as one or more computer program products, i.e., one or more computer programs tangibly embodied in an information carrier, e.g., in a machine readable storage device or matters capable of effecting a propagated signal, for execution by, or to control the operation of, data processing apparatus, e.g., a programmable processor, a computer, or multiple processors or computers.

A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The above described polishing apparatus and methods can be applied in a variety of polishing systems. Either the polishing pad, or the carrier head, or both can move to provide relative motion between the polishing surface and the wafer.

For example, the platen may orbit rather than rotate. The polishing pad can be a circular (or some other shape) pad secured to the platen. Some aspects of the endpoint detection system may be applicable to linear polishing systems (e.g., where the polishing pad is a continuous or a reel-to-reel belt that moves linearly). The polishing layer can be a standard (for example, polyurethane with or without fillers) polishing material, a soft material, or a fixed-abrasive material. Terms of relative positioning are used; it should be understood that the polishing surface and wafer can be held in a vertical orientation or some other orientations.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method of controlling polishing, comprising:
    polishing a first substrate having an overlying layer on an underlying layer or layer structure;
    during polishing of the first substrate, directing a light beam onto the first substrate, the light beam reflecting from the first substrate to generate a reflected light beam;
    during polishing of the first substrate, generating measurements over time of intensity of the reflected light beam;
    sorting the measurements into groups, each group associated with a different zone of a plurality of zones on the first substrate, the sorting generating a sequence of measurements for each zone;
    for each zone, determining based on the sequence of measurements for the zone including measurements that occur on or after the overlying layer in the zone is cleared, a time at which the overlying layer in the zone is cleared such that a top surface of the underlying layer or layer structure is exposed in the zone and storing the time at which the overlying layer in the zone is cleared;
    after the overlying layer is cleared such that the top surface of the underlying layer or layer structure is exposed, calculating at least one adjusted polishing pressure for at least zone of the plurality of zones based on a pressure applied in the at least one zone during polishing the first substrate, the time at which the overlying layer is cleared for the at least one zone, and the time at which the overlying layer is cleared for another zone of the plurality of zones; and
    polishing a second substrate using the at least one adjusted polishing pressure.

2. The method of claim 1, wherein the light beam is a non-polarized light beam.

3. The method of claim 2, wherein the non-polarized light beam is a laser beam.

4. The method of claim 2, wherein the non-polarized light beam comprises a broadband visible light beam.

5. The method of claim 1, wherein the overlying layer comprises GST.

6. The method of claim 5, wherein the light beam includes an infra-red component and the measurements of intensity of the reflected light beam are measurements of intensity of an infra-red component of the reflected light beam.

7. The method of claim 1, wherein the overlying layer is a metal.

8. The method of claim 1, wherein the overlying layer is copper, aluminum, tungsten, tantalum, titanium or cobalt.

9. The method of claim 8, wherein the light beam includes a visible red component and the measurements of intensity of the reflected light beam are measurements of intensity of the visible red component of the reflected light beam.

10. The method of claim 9, wherein polishing comprises polishing with a carrier head having a plurality of chambers to apply independently adjustable pressures to the plurality of zones on the substrate.

11. The method of claim 10, wherein during polishing of the first substrate a first chamber of the plurality of chambers applies a first pressure to a first zone of the plurality of zones and a second chamber of the plurality of chambers applies a second pressure to a second zone of the plurality of zones.

12. The method of claim 1, wherein the zones comprise concentric radial zones.

13. A method of controlling polishing, comprising:
polishing a first substrate having an overlying layer on an underlying layer or layer structure;
during polishing of the first substrate, monitoring the first substrate with an in-situ monitoring system to generate measurements over time;
sorting the measurements over time into groups, each group associated with a different zone of a plurality of zones on the first substrate, the sorting generating a sequence of measurements for each zone;
for each zone, determining based on the sequence of measurements for the zone including measurements that occur on or after the overlying layer in the zone is cleared, a time at which the overlying layer in the zone is cleared such that a top surface of the underlying layer or layer structure is exposed in the zone and storing the time at which the overlying layer in the zone is cleared;
after the overlying layer is cleared such that the top surface of the underlying layer or layer structure is exposed, calculating at least one adjusted polishing pressure for at least zone of the plurality of zones based on a pressure applied in the at least one zone during polishing the first substrate, the time at which the overlying layer is cleared for the at least one zone, and the time at which the overlying layer is cleared for another zone of the plurality of zones; and
polishing a second substrate using the at least one adjusted polishing pressure.

14. The method of claim 13, wherein the in-situ monitoring system comprises an optical monitoring system that directs a light beam onto the substrate.

15. The method of claim 13, wherein the in-situ monitoring system comprises a friction sensor.

16. The method of claim 15, further comprising calculating at least one adjusted polishing pressure for the first chamber based on the first pressure, the first time and the second time.

17. The method of claim 16, wherein calculating the adjusted pressure $P1'$ comprises calculating $P1'=P1*(T1/T2)$ wherein $P1$ is the first pressure, $T1$ is the first time and $T2$ is the second time.

18. The method of claim 13, wherein determining a time at which the underlying layer is exposed for each zone comprises determining a first time for a first zone from the plurality of zones and determining a second time for a second zone from the plurality of zones.

19. A computer program product, tangibly embodied in a non-transitory computer readable media, comprising instructions for causing a processor to:

during polishing of a first substrate, receive measurements over time of the first substrate from an in-situ monitoring system;
sort the measurements over time into groups, each group associated with a different zone of a plurality of zones on the first substrate so as to generate a sequence of measurements for each zone;
for each zone, determine a time at which the overlying layer is cleared based on the measurements from the associated group;
for each zone, determine based on the sequence of measurements for the zone including measurements that occur on or after the overlying layer in the zone is cleared, a time at which the overlying layer in the zone is cleared such that a top surface of the underlying layer or layer structure is exposed in the zone and storing the time at which the overlying layer in the zone is cleared;
after the overlying layer is cleared such that the top surface of the underlying layer or layer structure is exposed, calculate at least one adjusted polishing pressure for at least zone of the plurality of zones based on a pressure applied in the at least one zone during polishing the first substrate, the time at which the overlying layer is cleared for the at least one zone, and the time at which the overlying layer is cleared for another zone of the plurality of zones; and
cause the polishing system to polish a second substrate using the at least one adjusted polishing pressure.

20. The computer program product of claim 19, wherein the instructions to determine a time at which the underlying layer is exposed for each zone comprise instructions to determine a first time for a first zone from the plurality of zones and to determine a second time for a second zone from the plurality of zones.

21. The computer program product of claim 20, further comprising instructions to calculate at least one adjusted polishing pressure for a first chamber of a carrier head based on a first pressure, the first time and the second time.

22. The computer program product of claim 21, wherein the second zone comprises an innermost zone on the substrate.

23. The computer program product of claim 21, wherein the second zone comprises an outermost zone on the substrate.

24. The computer program product of claim 21, wherein the instructions to calculate the adjusted pressure $P1'$ comprise instructions to calculate $P1'=P1*(T1/T2)$ wherein $P1$ is the first pressure, $T1$ is the first time and $T2$ is the second time.

25. The computer program product of claim 19, wherein the instructions to determine a time at which the overlying layer in the zone is cleared comprise instructions to determine a time at which the sequence of measurements for the zone stabilizes.

26. The computer program product of claim 25, wherein the instructions to determine a time at which the sequence of measurements stabilizes includes instructions to determine that a slope of a trace generated by the sequence of measurements remains within a predetermined range for a predetermined time period.

* * * * *